United States Patent
Friedrich et al.

(10) Patent No.: US 7,580,375 B1
(45) Date of Patent: *Aug. 25, 2009

(54) SCALABLE MODERATED AUDIO CONFERENCING FOR MULTICAST AND UNICAST ENDPOINTS AND GATEWAYS

(75) Inventors: Walter R. Friedrich, Pleasanton, CA (US); Shantanu Sarkar, San Jose, CA (US); Nermin M. Ismail, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1012 days.

This patent is subject to a terminal disclaimer.

(21) Appl. No.: 10/886,796

(22) Filed: Jul. 8, 2004

(51) Int. Cl.
*H04L 12/16* (2006.01)

(52) U.S. Cl. .................. 370/260; 348/14.01; 370/329; 370/401; 379/202.01; 379/204.01; 381/17; 455/416; 455/514; 709/204

(58) Field of Classification Search ............. 370/260, 370/261, 329, 330, 401; 379/142.01, 202.1, 379/204.01; 348/14.01; 381/17; 455/416, 455/514; 709/204
See application file for complete search history.

(56) References Cited

U.S. PATENT DOCUMENTS

| | | | |
|---|---|---|---|
| 5,809,018 A * | 9/1998 | Lehmusto | 370/330 |
| 5,995,827 A * | 11/1999 | Gitlin et al. | 455/416 |
| 6,275,575 B1 * | 8/2001 | Wu | 379/202.01 |
| 6,310,862 B1 * | 10/2001 | Roy | 370/260 |
| 6,363,258 B1 * | 3/2002 | Schmidt et al. | 455/514 |
| 6,396,531 B1 * | 5/2002 | Gerszberg et al. | 348/14.01 |
| 6,781,971 B1 * | 8/2004 | Davis et al. | 370/329 |
| 6,847,618 B2 * | 1/2005 | Laursen et al. | 370/261 |
| 7,058,168 B1 * | 6/2006 | Knappe et al. | 379/204.01 |
| 7,068,792 B1 * | 6/2006 | Surazski et al. | 381/17 |
| 2003/0112947 A1 * | 6/2003 | Cohen | 379/202.01 |
| 2004/0013252 A1 * | 1/2004 | Craner | 379/142.01 |
| 2005/0041646 A1 * | 2/2005 | Punj et al. | 370/352 |
| 2005/0094580 A1 * | 5/2005 | Kumar et al. | 370/260 |

OTHER PUBLICATIONS

U.S. Appl. No. 10/119,865, filed Apr. 9, 2002, by inventors Ramanathan Jagadeesan and David Oran entitled "Devices, Software and Methods for Network Telephone Call Conferencing With Local Reconstruction of Voice Data," 46 total pages, Apr. 9, 2002.

(Continued)

*Primary Examiner*—Gerald Gauthier
(74) *Attorney, Agent, or Firm*—Baker Botts L.L.P.

(57) ABSTRACT

Providing a conference call includes establishing a bidirectional first class stream for each of a set of first class endpoints. A second class stream is established for each of a set of second class endpoints. Mixed streams are generated using the bidirectional first class streams, and one or more mixed streams are broadcasted to the set of second class endpoints. A particular second class endpoint is determined to have a right to have its stream included in the mixed streams. The second class stream for the particular second class endpoint is mapped to a bidirectional second class stream for the particular second class endpoint. Next mixed streams are generated using the bidirectional second class stream.

32 Claims, 2 Drawing Sheets

OTHER PUBLICATIONS

U.S. Appl. No. 10/680,918, filed Oct. 8, 2003, by inventors Scott S. Firestone, et al., entitled "*System and Method for Performing Distributed Video Conferencing,*" 64 total pages, Oct. 8, 2003.

"*Cisco IOS Software Releases 11.3, Configuring IP Multicast Routing,*" http://www.cisco.com, © 1992-2004, Cisco Systems, Inc., 62 total pages, Printed Jul. 2004.

"*Cisco IOS Multicast for Hoot & Holler Networks,*" http://www.cisco.com, © 1992-2002, Cisco Systems, Inc. 5 total pages, Printed Jul. 2004.

\* cited by examiner

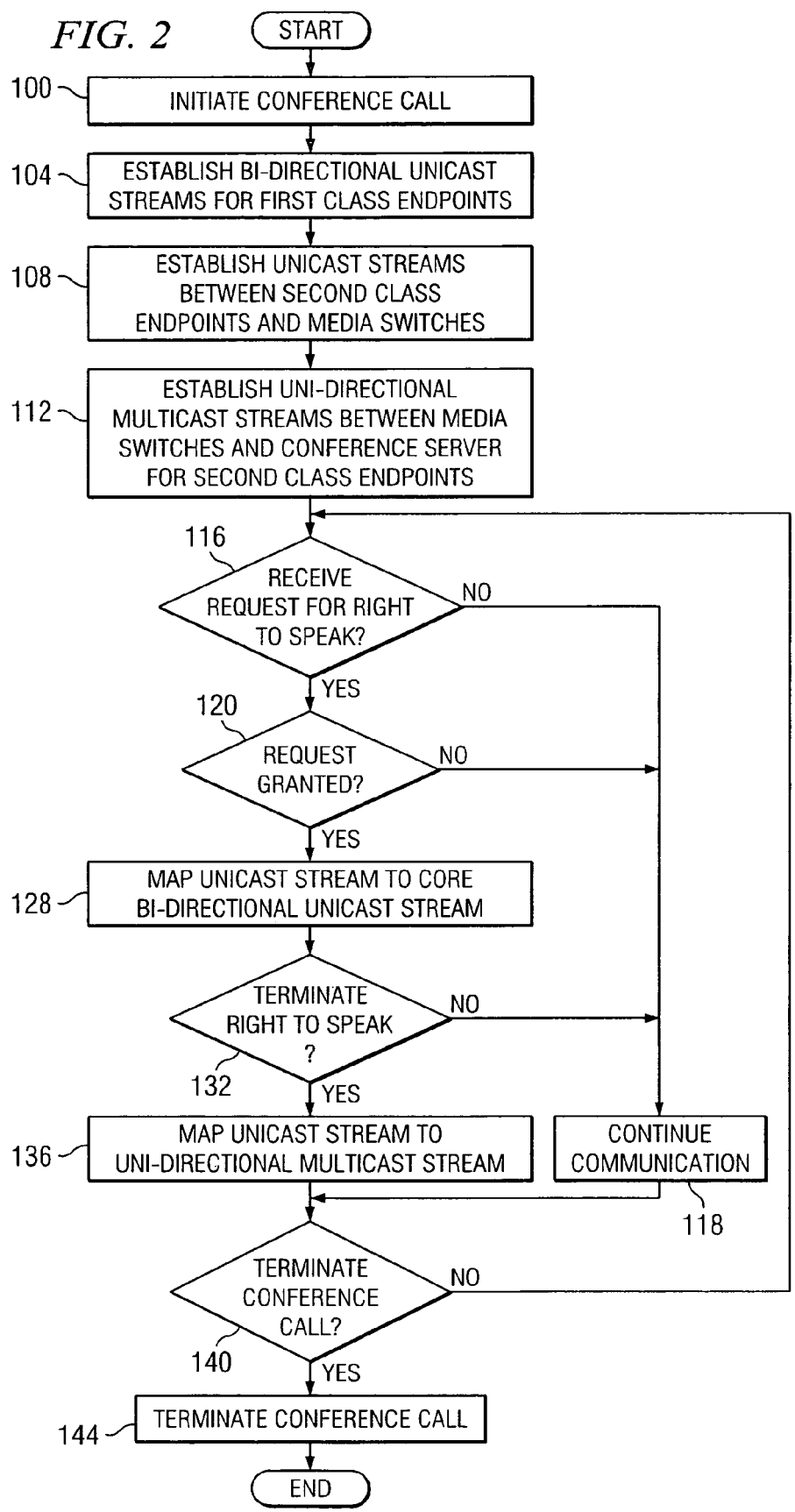

SCALABLE MODERATED AUDIO CONFERENCING FOR MULTICAST AND UNICAST ENDPOINTS AND GATEWAYS

TECHNICAL FIELD

This invention relates generally to the field of communications and more specifically to scalable moderated audio conferencing for multicast and unicast endpoints and gateways.

BACKGROUND

A conference call refers to a communication among more than two endpoints. Each endpoint sends an audio stream to a conference bridge. The conference bridge mixes the audio streams and transmits the mixed streams back to the endpoints. According to a known conferencing technique, the conference bridge establishes bidirectional unicast connections to each endpoint. Establishing bidirectional unicast connections to each endpoint, however, may not provide for efficient use of bandwidth.

According to another known conferencing technique, a multicast backbone (MBONE) multicasts audio streams from each endpoint to the other endpoints. The multicast backbone, however, requires the endpoints to support multicast processing. For example, the endpoints may be required to subtract their own speech or to perform audio mixing. Accordingly, legacy endpoints may not be able to participate. Moreover, this technique may require a large amount of digital signal processing. According to yet another known conferencing technique, conference calls may be distributed using routers such as media switches. The conference calls, however, are limited in the number of participants due to a centralized audio mixing architecture. Therefore, providing for efficient, flexible, and effective conferencing may be difficult in certain situations.

SUMMARY OF THE DISCLOSURE

In accordance with the present invention, disadvantages and problems associated with previous techniques for providing a conference call may be reduced or eliminated.

According to one embodiment, providing a conference call includes establishing a bidirectional first class stream for each of a set of first class endpoints. A second class stream is established for each of a set of second class endpoints. Mixed streams are generated using the bidirectional first class streams, and one or more mixed streams are broadcasted to the set of second class endpoints. A particular second class endpoint is determined to have a right to have its stream included in the mixed streams. The second class stream for the particular second class endpoint is mapped to a bidirectional second class stream for the particular second class endpoint. Next mixed streams are generated using the bidirectional second class stream.

Certain embodiments of the invention may provide one or more technical advantages. A technical advantage of one embodiment may be that each user may be assigned a class that defines the user's right to speak in a conference call. The classes may provide for more efficient use of resources. Another technical advantage of one embodiment may be that streams are distributed using multicast and converted to unicast before reaching endpoints and gateways. Accordingly, the endpoints and gateways are not required to support multicast capabilities.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 2 is a flowchart illustrating one embodiment of a method for providing a conference call that may be used with the system of FIG. 1.

DETAILED DESCRIPTION OF THE DRAWINGS

Figure 1:
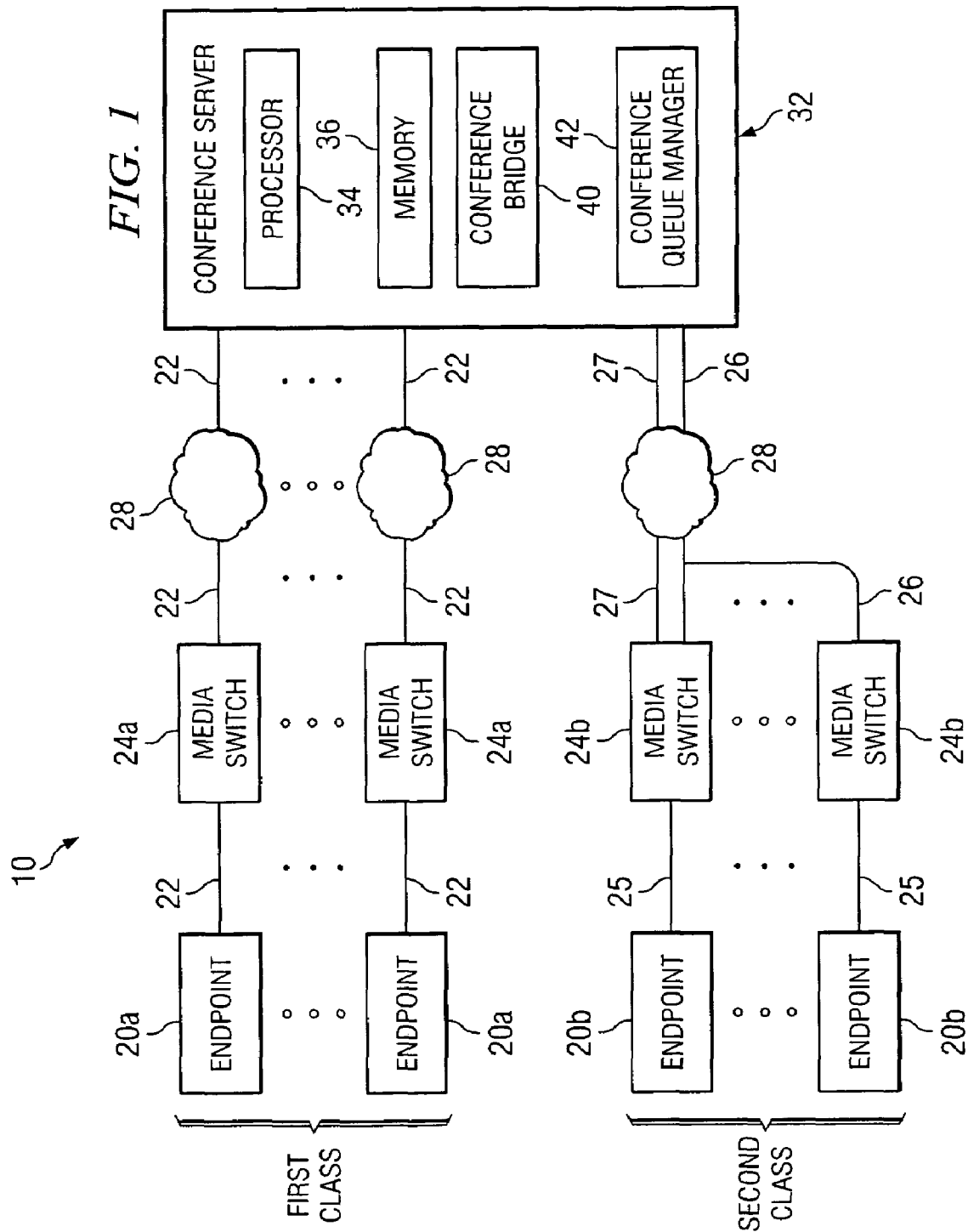
FIG. 1 is a block diagram of one embodiment of a system for providing a conference call.

Embodiments of the present invention and its advantages are best understood by referring to FIGS. 1 and 2 of the drawings, like numerals being used for like and corresponding parts of the various drawings.

FIG. 1 is a block diagram of one embodiment of a system 10 for providing a conference call. A conference call refers to a call that has more than two endpoints participating in the call. Certain endpoints may send streams to a conference server, which mixes the streams to form mixed streams. Mixed streams are distributed via multicast. According to the embodiment, system 10 includes media switches that convert the multicast streams to unicast streams to allow unicast endpoints to participate in a conference call. Moreover, each participating user of the conference call is associated with a class that specifies the user's right to speak in the conference call.

According to the illustrated embodiment, endpoints 20 communicate with system 10, which includes media switches 24, communication networks 28, and a conference server 32 coupled as shown. According to the embodiment, each user participating in a conference call is associated with a class. A participating user may be identified by a user identifier, a telephone number, a endpoint identifier, a passcode, other identifier, or any combination of the preceding. A class defines the user's interaction, such as the right to speak, in the conference call. A class may be associated with a priority, and each priority may then be associated with a specific type of interaction in the conference call.

As an example, each user is associated with a class of two classes. A first class user is allowed to send a stream to be included in the mixed streams, or "speak," during the conference call, and is not required to request the right to have its stream included in the mixed streams. A second class user joins the conference call in a listen-only mode, but may request the right to speak, or the right to have its stream included in the mixed streams. The request for the right to speak may or may not be granted depending upon a conference policy. When the right to speak is terminated, the second class user goes back to a listen-only mode.

A conference call may have any suitable number of first class users and any suitable number of second class users. In a typical embodiment, there may be more second class users than first class users. Typically, the number of users who may speak is limited. System 10 allows for listen-only users to participate in the conference call. Moreover, any suitable number of classes may be used. As an example, there may be a third class that joins the conference call in a speak-only mode that does not receive mixed streams. As another example, there may be a third class that joins the conference call in a listen-only mode that cannot request a right to speak.

A conference policy may govern the conference call, and may specify, for example, the participating users, the classes of the users, other feature, or any combination of the preceding. The conference policy may also specify the circumstances under which a particular class may be allowed to speak. For example, a conference policy may specify that a first class user may speak at any time, but a second class user may need to be granted the right to speak.

The conference policy may also specify a procedure to determine which endpoints 20 may be allowed to speak. For example, requesting second class endpoints 20b may be granted the right to speak on a first-come, first-serve policy, a round robin policy, a priority-based policy, or other policy. Any suitable combination of users may speak. For example, two active speakers may be selected from the first class users, and two speakers may be selected from the second class users according to a conference policy.

An endpoint 20 may comprise any hardware, software, firmware, or combination of the preceding operable to communicate with system 10, for example, a telephone, a cellular telephone, a personal digital assistant, or any other device suitable for communicating streams such as audio streams to and from system 10. Endpoint 20 may support, for example, Internet Protocol (IP) or other suitable communication protocol.

A stream may refer to a flow of information, which may be organized in packets. Information may refer to data, audio, video, multimedia, other suitable type of information, or any combination of the preceding. An endpoint 20 may be operable to communicate using unicast, multicast, or both unicast and multicast streams. As an example, endpoint 20 might not have multicast capabilities. A unicast stream refers to a stream that is communicated from one device to another device, and a multicast stream refers to a stream that that is broadcast from one device to the devices of a multicast group. Accordingly, certain unicast legacy endpoints may be used with system 10. System 10 can communicate with endpoints 20 operable to receive different types of streams, so legacy endpoints and other endpoints may participate in the same conference call.

Endpoints 20 may include first class endpoints 20a and second class endpoints 20b. First class endpoints 20a may be endpoints 20 corresponding to first class users. Second class endpoints 20b may be endpoints 20 corresponding to second class users. A class may be associated with a specific type of stream. A first class endpoint 20a may communicate using a bidirectional unicast stream 22 either directly with conference server 32 or through a first class media switch 24a. First class endpoint 20a may receive a mixed stream through bidirectional unicast stream 22, and may be permitted to speak in the conference call at any time.

A second class endpoint 20b may communicate with a second class media switch 24b using a listen-only, unidirectional, unicast stream 26, which receives the mixed stream from a multicast stream 26. Second class endpoint 20b may be required to request the right to speak in order to have its stream included in the mixed streams.

The right to speak may be requested in any suitable manner. As an example, a user may send a request by pressing a key on a keypad of second class endpoint 20b, saying a word or phrase into an input of endpoint 20b, or performing some other action. Endpoint 20b may then translate the action into a request for the right to speak, and send the request to conference server 32. As another example, endpoint 20b may automatically generate the request for the right to speak in response to detecting voice activity.

The request may need to be granted in order for second class endpoint 20b to be able to speak. Whether or not a request is granted may depend the conference policy governing the conference call. Multiple requests may be granted according to the conference policy. When second class endpoint 20 has been granted the right to speak, unicast stream 25 is mapped to core bidirectional unicast stream 27.

Media switches 24 may comprise devices that provide control interfaces to conference server 32, and may operate to switch streams between endpoints 20 and conference server 32. A network device such as a router, switch, or wireless access point may provide media switch 24 functionality because a media switch 24 does not necessarily require a digital signal processor (DSP). A media switch 24 may comprise devices that provide control interfaces to conference server 32, and may operate to switch streams between endpoints 20 and conference server 32. Media switch 24 may include a memory operable to store data and a processor operable to manage the operations of media switch 24 such as switching streams.

According to one embodiment, media switch 24 may perform mapping operations that allow a second class endpoint 20b to speak. When second class endpoint 20 has been granted the right to speak, media switch 24 maps unicast stream 25 from multicast stream 26 to core bidirectional unicast stream 27. When the right to speak is revoked, media switch 24 maps unicast stream 25 back to multicast stream 26.

Communication network 28 allows endpoints 20 to communicate with other networks or devices. Communication network 28 may comprise all or a portion of public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding.

Conference server 32 receives streams from certain endpoints 20, mixes the streams to form mixed streams, and sends the mixed streams to endpoints 20. According to the illustrated embodiment, conference server 32 comprises a processor 34, a memory 36, a conference bridge 40, and a conference queue manager 42.

Conference server 32 includes a conference manager application that operates as a controller and a rendezvous point for conference calls. In H.323 terms, the conference manager, application behaves as a multipoint controller. The application manages the insertion of calls into a conference call and termination of calls from the conference call. Conference and scheduling resources such as conference bridges may be allocated by the application. The application may carry out the conference policy of the conference call.

According to the illustrated embodiment, processor 34 executes instructions and manipulates data to perform the operations of conference server 32. Although FIG. 1 illustrates a single processor 34, multiple processors 34 may be used according to particular needs.

Memory 120 stores and facilitates retrieval of information used by processor 34 to perform the functions of conference server 32, and may, for example, store instructions and data used by processor 34. As an example, memory 120 may store a conference policy. Memory 120 may include any volatile or non-volatile storage and retrieval device or devices. One or more memories 120 may be used according to particular needs.

Conference bridge 40 determines the class associated with each endpoint 20 and notifies media switches 24 of the classes. One conference bridge 40 may be provided to serve one or more media switches 24. Conference bridge 40 includes an audio mixer that mixes received audio streams to generate mixed streams, which conference bridge 40 distributes to media switches 24. According to one embodiment, conference bridge 40 identifies the size of the appropriate jitter buffer for each endpoint 20 and couples endpoints 20 to the appropriate jitter buffer. Conference bridge 40 sums together the outputs of the jitter buffers and creates mixed audio streams with unique output network time protocol (NTP) time stamps. Conference bridge 40 then determines the input-to-output mapping for each input audio stream to map the NTP time stamp of each input stream to the mixed output streams.

Conference bridge 40 may provide time stamps for multicast stream 26 and for bidirectional unicast stream 27. Media switch 24b may use the time stamped packets to provide a smooth transition between a non-speaking session and a speaking session for second class endpoint 20b. For example, media switch 24b determines that a request from endpoint 20b has been granted. To switch unicast stream 25 from multicast stream 26 to unicast stream 27, media switch 24 determines the time stamps of the packets of multicast stream 26 and the time stamps of the packets of unicast stream 27. Media switch 24 switches unicast stream 25 in accordance with the time stamps such that a packet of multicast stream 26 with a time stamp is followed by a packet of unicast stream 27 with the next time stamp.

Conference bridge 40 may perform other suitable operations. As an example, conference bridge 40 may determine the capabilities, locations, and regions of endpoints 20. As another example, conference bridge 40 may provides audio transcoding as part of the mixing in order to allow endpoints 20 using different codecs to join the same conference call without external processing. In addition, conference bridge 40 may be provided at any suitable location. For example, conference bridge 40 may be provided in a router, a gateway, a switch, a load balancer, or in any other suitable location operable to facilitate their operations.

Conference queue manager 42 receives requests for the right to speak and grants requests according to a conference policy. If multiple requests are received, conference queue manager 42 may decide the one or more requests that may be granted. The decision may be based on a conference policy, for example, a first-come, first-serve policy, a round robin policy, a priority-based policy, or any other suitable policy. According to one embodiment, conference queue manager 42 may be omitted, and a user may receive and grant the requests.

Processor 34, memory 36, conference bridge 40, and conference queue manager 42 may be integrated or separated according to particular needs. For example, the present invention contemplates the functions of both processor 34 and memory 36 being provided using a single device, for example, a single computer. If any of the components of conference server 32 are separated, the separated components may be coupled by a network link or other suitable link.

System 10 may be generally configured or arranged to be deployed with different call control protocol architectures, fitting in either a centralized architecture or a distributed architecture. The configuration changes implied by this architecture may affect the application, call control, and media layers in accordance with particular embodiments of the present invention.

Although system 10 has been described in detail with reference to audio conferencing communications, system 10 may be used for any protocol involving routing, mapping, or redirection of streaming information in any communication environment. The use of audio conferencing communications has only been offered for purposes of teaching and should not be construed to limit the scope of the present invention in any way. Any suitable communications that involve two or more participating entities may benefit from the teachings of the present invention.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of conference bridge 40 may be performed by more than one module. Additionally, operations of system 10 may be performed using any suitable logic comprising software, hardware, other logic, or any suitable combination of the preceding. As used in this document, "each" refers to each member of a set or each member of a subset of a set. As used in this document, "set" refers to a collection of one or more elements.

FIG. 2 is a flowchart illustrating one embodiment of a method for providing a conference call that may be used with system 10 of FIG. 1. The method begins at step 100, when a conference call is initiated. The conference call may be initiated in response to a call received at conference server 32 from endpoint 20.

Bidirectional unicast streams 22 are established for first class endpoints 20a at step 104. Bidirectional unicast streams 22 may allow first class endpoints 20a to communicate in the conference call according to first class policies. For example, first class endpoints 20a may be allowed to speak without requesting the right to speak. Conference bridge 40 may mix the streams from first class endpoints 20a to generate mixed streams, which are distributed to endpoints 20.

Unicast streams 25 are established between second class endpoints 20b and media switches 24b at step 108. Accordingly, endpoints 20b are not required to have multicast capabilities. Unicast streams 25 may be unidirectional or bidirectional. Unidirectional multicast streams 26 are established between media switches 24b and conference server 32 at step 112. Unidirectional multicast streams 26 multicast the mixed streams from conference bridge 40 to media switches 24b.

A request for the right to speak may be received from one or more second class endpoints 20b at step 116. If no request is received at step 116, the method proceeds to step 118, where communication is continued as in the previous step. The method then proceeds to step 140.

If a request is received at step 116, the method proceeds to step 120. One or more requests for the right to speak may be granted at step 120. Conference queue manager 42 may grant the request according to a conference policy. Alternatively, a user of endpoint 20 may grant one or more requests. If no requests are granted at step 120, the method proceeds to step 118, where communication is continued as in the previous step. The method then proceeds to step 140.

If a request for a second class endpoint 20b is granted at step 120, the method proceeds to step 128. Unicast stream 25 for endpoint 20b is mapped to core bidirectional unicast stream 27 at step 128 to allow endpoint 20b to speak. Accordingly, an embodiment of the method may be identified by the opening of new ports with unicast streams 27 to conference bridge 40 as endpoints 20 join the conference call. Conference bridge 40 receives the stream and mixes the received stream with other streams to generate the mixed streams.

The right to speak may be terminated at step 132. The right to speak may be terminated in any suitable manner. For example, endpoint 20b requesting the right to speak may request a termination of the session. As another example, another endpoint 20 such as a first class endpoint 20a may terminate the right to speak. As another example, conference queue manager 42 may terminate the right to speak according to a conference policy corresponding to endpoint 20b.

If the right to speak is not terminated at step 132, the method proceeds to step 118, where communication is continued as in the previous step. The method then proceeds to step 140. If the right to speak is terminated at step 132, the method proceeds to step 136. Unicast stream 25 is mapped from core bidirectional unicast stream 27 to unidirectional multicast stream 26 at step 136.

The conference call may be terminated at step 140. As an example, the conference call may be terminated when endpoints 20 of the conference call have terminated their call sessions. As another example, a particular endpoint 20 may be able to terminate the conference call. As another example, conference queue manager 42 may terminate the conference call according to a conference policy. If the conference call is not terminated at step 140, the method returns to step 116 to wait for a request for the right to speak. If the conference call is to be terminated at step 140, the method proceeds to step 144 to terminate the conference call. After terminating conference call, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that each user may be assigned a class that defines the user's right to speak in a conference call. The classes may provide for more efficient use of resources. Another technical advantage of one embodiment may be that legacy endpoints and gateways may connect via unicast to local media switches, such that the endpoints and gateways are not required to support multicast capabilities.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for providing a conference call, comprising:
   establishing, by a conference server comprising hardware, a set of bidirectional first class streams for a set of first class endpoints, a bidirectional first class stream established for a first class endpoint;
   establishing a set of second class streams for a set of second class endpoints, a second class stream established for a second class endpoint;
   mixing the set of bidirectional first class streams to generate a plurality of mixed streams;
   broadcasting one or more of the mixed streams to the set of second class endpoints;
   determining that a particular second class endpoint has a right to have its stream included in the mixed streams;
   mapping the second class stream for the particular second class endpoint to a bidirectional second class stream for the particular second class endpoint; and
   mixing the bidirectional second class stream and the set of bidirectional first class streams to generate a plurality of next mixed streams.

2. The method of claim 1, wherein a bidirectional first class stream for a first class endpoint further comprises a bidirectional unicast stream between the first class endpoint and a conference server.

3. The method of claim 1, wherein:
   a second class stream for a second class endpoint further comprises a unicast stream and a multicast stream, the unicast stream being between the second class endpoint and a media switch, the multicast stream being between the media switch and a conference server; and
   a bidirectional second class stream for the second class endpoint further comprises the unicast stream and another bidirectional unicast stream, the bidirectional unicast stream being between the media switch and the conference server.

4. The method of claim 1, further comprising:
   detecting that the right has been terminated; and
   mapping the bidirectional second class stream for the particular second class endpoint to the second class stream for the particular second class endpoint.

5. The method of claim 1, wherein determining that the particular second class endpoint has the right to have its stream included in the mixed streams further comprises:
   receiving a request for the right from the particular second class endpoint; and
   granting the request for the right.

6. The method of claim 1, wherein determining that the particular second class endpoint has the right to have its stream included in the mixed streams further comprises:
   receiving a plurality of requests for the right from a plurality of second class endpoints;
   selecting the particular second class endpoint from the plurality of second class endpoints according to a conference policy; and
   granting the request from the particular second class endpoint.

7. The method of claim 1, wherein mapping the second class stream for the particular second class endpoint to the bidirectional second class stream for the particular second class endpoint further comprises:
   determining a time stamp of a packet of the second class stream;
   determining a time stamp of a packet of the bidirectional second class stream; and
   mapping the streams in accordance with the time stamps.

8. A system for providing a conference call, comprising:
   a conference server operable to:
      establish a set of bidirectional first class streams for a set of first class endpoints, a bidirectional first class stream established for a first class endpoint;
      establish a set of second class streams for a set of second class endpoints, a second class stream established for a second class endpoint;
      mix the set of bidirectional first class streams to generate a plurality of mixed streams;
      broadcast one or more of the mixed streams to the set of second class endpoints; and
      determine that a particular second class endpoint has a right to have its stream included in the mixed streams; and
   a media switch coupled to the conference server and operable to map the second class stream for the particular second class endpoint to a bidirectional second class stream for the particular second class endpoint, the conference server further operable to mix the bidirectional second class stream and the set of bidirectional first class streams to generate a plurality of next mixed streams.

9. The system of claim 8, wherein a bidirectional first class stream for a first class endpoint further comprises a bidirectional unicast stream between the first class endpoint and a conference server.

10. The system of claim 8, wherein:
   a second class stream for a second class endpoint further comprises a unicast stream and a multicast stream, the unicast stream being between the second class endpoint and a media switch, the multicast stream being between the media switch and a conference server; and
   a bidirectional second class stream for the second class endpoint further comprises the unicast stream and another bidirectional unicast stream, the bidirectional unicast stream being between the media switch and the conference server.

11. The system of claim 8, the media switch further operable to:
   detect that the right has been terminated; and
   map the bidirectional second class stream for the particular second class endpoint to the second class stream for the particular second class endpoint.

12. The system of claim 8, the conference server further operable to determine that the particular second class endpoint has the right to have its stream included in the mixed streams by:
   receiving a request for the right from the particular second class endpoint; and
   granting the request for the right.

13. The system of claim 8, the conference server further operable to determine that the particular second class endpoint has the right to have its stream included in the mixed streams by:
   receiving a plurality of requests for the right from a plurality of second class endpoints;
   selecting the particular second class endpoint from the plurality of second class endpoints according to a conference policy; and
   granting the request from the particular second class endpoint.

14. The system of claim 8, the media switch further operable to map the second class stream for the particular second class endpoint to the bidirectional second class stream for the particular second class endpoint by:
   determining a time stamp of a packet of the second class stream;
   determining a time stamp of a packet of the bidirectional second class stream; and
   mapping the streams in accordance with the time stamps.

15. A memory storing instructions for providing a conference call, the instructions when executed by a processor operable to:
   establish a set of bidirectional first class streams for a set of first class endpoints, a bidirectional first class stream established for a first class endpoint;
   establish a set of second class streams for a set of second class endpoints, a second class stream established for a second class endpoint;
   mix the set of bidirectional first class streams to generate a plurality of mixed streams;
   broadcast one or more of the mixed streams to the set of second class endpoints;
   determine that a particular second class endpoint has a right to have its stream included in the mixed streams;
   map the second class stream for the particular second class endpoint to a bidirectional second class stream for the particular second class endpoint; and
   mix the bidirectional second class stream and the set of bidirectional first class streams to generate a plurality of next mixed streams.

16. The memory of claim 15, wherein a bidirectional first class stream for a first class endpoint further comprises a bidirectional unicast stream between the first class endpoint and a conference server.

17. The memory of claim 15, wherein:
   a second class stream for a second class endpoint further comprises a unicast stream and a multicast stream, the unicast stream being between the second class endpoint and a media switch, the multicast stream being between the media switch and a conference server; and
   a bidirectional second class stream for the second class endpoint further comprises the unicast stream and another bidirectional unicast stream, the bidirectional unicast stream being between the media switch and the conference server.

18. The memory of claim 15, the instructions further operable to:
   detect that the right has been terminated; and
   map the bidirectional second class stream for the particular second class endpoint to the second class stream for the particular second class endpoint.

19. The memory of claim 15, the instructions further operable to determine that the particular second class endpoint has the right to have its stream included in the mixed streams by:
   receiving a request for the right from the particular second class endpoint; and
   granting the request for the right.

20. The memory of claim 15, the instructions further operable to determine that the particular second class endpoint has the right to have its stream included in the mixed streams by:
   receiving a plurality of requests for the right from a plurality of second class endpoints;
   selecting the particular second class endpoint from the plurality of second class endpoints according to a conference policy; and
   granting the request from the particular second class endpoint.

21. The memory of claim 15, the instructions further operable to map the second class stream for the particular second class endpoint to the bidirectional second class stream for the particular second class endpoint by:
   determining a time stamp of a packet of the second class stream;
   determining a time stamp of a packet of the bidirectional second class stream; and
   mapping the streams in accordance with the time stamps.

22. A system for providing a conference call, comprising:
   means for establishing a set of bidirectional first class streams for a set of first class endpoints, a bidirectional first class stream established for a first class endpoint;
   means for establishing a set of second class streams for a set of second class endpoints, a second class stream established for a second class endpoint;
   means for mixing the set of bidirectional first class streams to generate a plurality of mixed streams;
   means for broadcasting one or more of the mixed streams to the set of second class endpoints;
   means for determining that a particular second class endpoint has a right to have its stream included in the mixed streams;

means for mapping the second class stream for the particular second class endpoint to a bidirectional second class stream for the particular second class endpoint; and means for mixing the bidirectional second class stream and the set of bidirectional first class streams to generate a plurality of next mixed streams.

23. A method for providing a conference call, comprising:

establishing, by a conference server comprising hardware, a set of bidirectional first class streams for a set of first class endpoints, a bidirectional first class stream established for a first class endpoint, a bidirectional first class stream for a first class endpoint further comprising a bidirectional unicast stream between the first class endpoint and a conference server;

establishing a set of second class streams for a set of second class endpoints, a second class stream established for a second class endpoint, a second class stream for a second class endpoint further comprises a unicast stream and a multicast stream, the unicast stream being between the second class endpoint and a media switch, the multicast stream being between the media switch and a conference server;

mixing the set of bidirectional first class streams to generate a plurality of mixed streams;

broadcasting one or more of the mixed streams to the set of second class endpoints;

determining that a particular second class endpoint has a right to have its stream included in the mixed streams, wherein determining that the particular second class endpoint has the right further comprises:

receiving a plurality of requests for the right from a plurality of second class endpoints;

selecting the particular second class endpoint from the plurality of second class endpoints according to a conference policy; and granting the request from the particular second class endpoint;

mapping the second class stream for the particular second class endpoint to a bidirectional second class stream for the particular second class endpoint, a bidirectional second class stream for the second class endpoint further comprises the unicast stream and another bidirectional unicast stream, the bidirectional unicast stream being between the media switch and the conference server, wherein mapping the second class stream for the particular second class endpoint to the bidirectional second class stream for the particular second class endpoint further comprises:

determining a time stamp of a packet of the second class stream;

determining a time stamp of a packet of the bidirectional second class stream; and mapping the streams in accordance with the time stamps;

mixing the bidirectional second class stream and the set of bidirectional first class streams to generate a plurality of next mixed streams;

detecting that the right has been terminated; and mapping the bidirectional second class stream for the particular second class endpoint to the second class stream for the particular second class endpoint.

24. A conference server for providing a conference call, comprising:

a memory operable to store data; and a processor coupled to the memory and operable to:

establish a set of bidirectional first class streams for a set of first class endpoints, a bidirectional first class stream established for a first class endpoint;

establish a set of second class streams for a set of second class endpoints, a second class stream established for a second class endpoint;

mix the set of bidirectional first class streams to generate a plurality of mixed streams;

broadcast one or more of the mixed streams to the set of second class endpoints; and determine that a particular second class endpoint has a right to have its stream included in the mixed streams;

initiate mapping of the second class stream for the particular second class endpoint to a bidirectional second class stream for the particular second class endpoint; and mix the bidirectional second class stream and the set of bidirectional first class streams to generate a plurality of next mixed streams.

25. The conference server of claim 24, wherein a bidirectional first class stream for a first class endpoint further comprises a bidirectional unicast stream between the first class endpoint and the conference server.

26. The conference server of claim 24, wherein:

a second class stream for a second class endpoint further comprises a unicast stream and a multicast stream, the unicast stream being between the second class endpoint and a media switch, the multicast stream being between the media switch and the conference server; and a bidirectional second class stream for the second class endpoint further comprises the unicast stream and another bidirectional unicast stream, the bidirectional unicast stream being between the media switch and the conference server.

27. The conference server of claim 24, the processor further operable to determine that the particular second class endpoint has the right to have its stream included in the mixed streams by:

receiving a request for the right from the particular second class endpoint; and granting the request for the right.

28. The conference server of claim 24, the processor further operable to determine that the particular second class endpoint has the right to have its stream included in the mixed streams by:

receiving a plurality of requests for the right from a plurality of second class endpoints;

selecting the particular second class endpoint from the plurality of second class endpoints according to a conference policy; and granting the request from the particular second class endpoint.

29. A media switch for providing a conference call, comprising:

a memory operable to store data; and a processor coupled to the memory and operable to:

enable communication with a set of second class endpoints using a set of second class streams, a second class stream associated with a second class endpoint, the set of second class endpoints have a lower priority than a set of first class endpoints, the set of first class endpoints associated with a set of first class streams;

establish that a particular second class endpoint has a right to have its stream included in the mixed streams; and map the second class stream for the particular second class endpoint to a bidirectional second class stream for the particular second class endpoint.

30. The media switch of claim 29, wherein:
a second class stream for a second class endpoint further comprises a unicast stream and a multicast stream, the unicast stream being between the second class endpoint and the media switch, the multicast stream being between the media switch and a conference server; and
a bidirectional second class stream for the second class endpoint further comprises the unicast stream and another bidirectional unicast stream, the bidirectional unicast stream being between the media switch and the conference server.

31. The media switch of claim 29, the processor further operable to:

establish that the right has been terminated; and
map the bidirectional second class stream for the particular second class endpoint to the second class stream for the particular second class endpoint.

32. The media switch of claim 29, the media switch further operable to map the second class stream for the particular second class endpoint to the bidirectional second class stream for the particular second class endpoint by:

determining a time stamp of a packet of the second class stream;
determining a time stamp of a packet of the bidirectional second class stream; and
mapping the streams in accordance with the time stamps.

* * * * *

UNITED STATES PATENT AND TRADEMARK OFFICE
CERTIFICATE OF CORRECTION

PATENT NO.         : 7,580,375 B1                                            Page 1 of 1
APPLICATION NO.    : 10/886796
DATED              : August 25, 2009
INVENTOR(S)        : Friedrich et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1447 days.

Signed and Sealed this

Fourteenth Day of September, 2010

David J. Kappos
*Director of the United States Patent and Trademark Office*